United States Patent Office 3,551,279
Patented Dec. 29, 1970

3,551,279
SYNTHETIC FIBER HAVING SILK-LIKE SURFACE LUSTER AND LIGHT TRANSPARENCY
Satoshi Ando, Osaka, Toru Uraya, Kobe, and Koetsu Nagata, Osaka, Japan, assignors to Kanegafuchi Boseki Kabushiki Kaisha, Tokyo, Japan, and Snia Viscosa, Società Nazionale Industria Applicazioni Viscosa S.p.A., Milan, Italy
Filed Aug. 19, 1968, Ser. No. 753,572
Claims priority, application Japan, Aug. 25, 1967, 42/54,598
Int. Cl. D02g 3/36
U.S. Cl. 161—174
14 Claims

ABSTRACT OF THE DISCLOSURE

Synthetic fibers having a silk-like surface luster and light transparency are prepared by spinning a polymer composition having delustering effect and another polymer composition having substantially no delustering effect through a common orifice simultaneously into a sheath-core type composite fiber having non-circular cross-section wherein the former polymer composition forms the core component and the latter polymer composition forms the sheath component. The polymer composition having delustering effect is obtained by adding at least 0.3% by weight of a delustrant of titanium oxide particles, the maximum size of which is $5\mu$ and which comprise at least 50% by weight of particles having a size of less than $1.0\mu$ thereto and the polymer composition having substantially no delustering effect is obtained by adding less than 0.06% by weight of the same titanium oxide particles as described above thereto.

---

The present invention relates to non-circular cross-sectional composite fiber composed of synthetic linear polymers and having a silk-like surface luster and light transparency, wherein a polymer composition having delustering effect and a polymer composition having substantially no delustering effect are arranged in a sheath-core type as the core component and the sheath component respectively.

Recently, a large number of processes have been proposed, wherein silk-like surface luster is imparted to the synthetic fiber by making the cross-section of the fiber non-circular. However, all the fibers obtained by these processes show a glitter and considerably unnatural high luster and the woven fabric and knitted goods composed of these fibers, which do not contain a delustrant, are too light transparent, so that they have difficulties in utilization for underwears and the like, while the woven fabric and knitted goods containing a delustrant have drawbacks in luster and it was difficult to satisfy both the silk-like luster and the moderate light transparency.

The inventors have made various studies in order to overcome the above drawbacks and found that a non-circular cross-sectional fiber comprising a polymer composition having delustering effect and a polymer composition having substantially no delustering effect, both of which are compounded with titanium oxide particles, the maximum size of which is at most $5\mu$ and which comprises at least 50% by weight having a size of less than $1.0\mu$, in given amounts respectively, in a sheath-core type, has a silk-like excellent surface luster and moderate light transparency and the present invention has been accomplished.

Namely, the present invention consists in a sheath-core type composite fiber having a silk-like surface luster and light transparency and consisting of synthetic high polymers, which is characterized in that the core component contains at least 0.3% by weight of titanium oxide particles, the maximum size of which is at most $5\mu$ and in which at least 50% by weight has a size of less than $1.0\mu$, that the sheath component contains at most 0.06% by weight of the said titanium oxide particles, that the ratio of the core component to the sheath component occupying the cross-section of the filament is in the range between 70:30 and 40:60, that the degree of deformation herein defined ranges 1.25 ~ 3.0 and that two to six concave or flat surfaces uniformly extend along the longitudinal axis of the filament.

The term "degree of deformation" of fiber used herein means a ratio of the maximum radius R to the minimum radius $r$ ($R/r$) of a cross-section in a direction perpendicular to the axis of the non-circular cross-sectional filament as shown in FIG. 1.

Titanium oxide to be used in the present invention is obtained by pulverizing the fine powder very finely with a ball mill, but it may be obtained by a convenient process other than the ball mill, if such a process can provide very finely pulverized titanium oxide particles suitable for applying to the present invention.

The particle size distribution of the titanium oxide thus obtained was determined by the following method.

Namely, to water at 20° C. containing 0.1% by weight based on titanium oxide, of sodium pyrophosphate was added 1% by weight of titanium oxide and said titanium oxide was dispersed homogeneously and introduced into volume of the above described dispersion is taken out a messcylinder and left to stand, after which a given by a pipette from the bottom of messcylinder at every given time and an amount of titanium oxide contained therein was determined by an absolute drying process.

Then, by using the following Formula 1, a curve of particle size distribution was made from the precipitated amount at every precipitating time corresponding to particle size within a certain range.

$$t = \frac{h}{v} = 18 \frac{h\eta}{(\sigma - \rho)g} \cdot \frac{1}{d^2} \qquad (1)$$

wherein $t$: time necessary for precipitation of titanium oxide
$\sigma$: density of titanium oxide
$d$: particle size of titanium oxide
$\rho$: density of water containing the dispersing agent
$\eta$: viscosity of water containing the dispersing agent
$h$: height of fluid in the precipitater
$v$: precipitating rate cm./sec.
$g$: acceleration of gravity cm./sec.$^2$ In the above precipitating method, very fine particles need a long time for the precipitation and particularly, in a size of less than $0.5\mu$ the particle size of titanium oxide is very small, so that such particles need a very long time.

The titanium oxide suitable for the present invention has the maximum particle size of $5\mu$ and contains at least 50%, preferably 60% by weight of particles having a size of less than $1.0\mu$. The titanium oxide satisfying this requirement is excellent in a homogeneous miscibility and dispersibility in the component polymers and particularly, the titanium oxide containing at least 60% by weight of particles having a size of less than $1.0\mu$ is remarkable in such characteristics and such titanium oxide can give synthetic fiber having a very similar surface luster and light transparency to those of silk, but beyond the above described range, the resulting fiber is insufficient in silk-like luster and light transparency. The fiber according to the present invention should satisfy the following requirement.

Namely, the fiber is a sheath-core type composite fiber, wherein the core polymer contains at least 0.3%, preferably, at least 0.5% by weight of the above described titanium oxide and the sheath polymer contains at most 0.06%, preferably, at most 0.03% by weight of the titanium oxide. The ratio of the core component to the sheath component occupying the cross-section perpendicular to the axis of the filament is in the range between 70:30 and 40:60, preferably, 60:40 and 40:60.

When the content of titanium oxide in the core component is less than 0.3% by weight, the surface luster is considerably high and very unnatural, and the light transparency is higher than that of silk, while, when the content of titanium oxide in the sheath component is more than 0.06% by weight, the light transparency reduces and the surface luster is poor.

Furthermore, relating to the conjugate ratio in the cross-section of the filament, when the ratio of the core component exceeds 70%, the surface luster and the light transparency decrease, while when the ratio of the sheath component exceeds 60%, the light transparency and surface luster are considerably too high and such ratios are not preferable.

Moreover, the fiber according to the present invention should have a degree of deformation of 1.25 to 3.0, preferably 1.70 to 3.0 and have two to six concave or flat surfaces extending uniformly along the longitudinal axis of the filament. When the degree of deformation is less than 1.25, the cross-section of the fiber does not substantially distinguish from circular cross-section, so that the silk-like luster cannot be imparted to the fiber and when the degree of deformation exceeds 3.0, such a fiber has drawback in the strength and elongation and the spinning drawability.

On the other hand, the shape of the core layer in the cross-section of the filament having the above described degree of deformation according to the present invention is not particularly limited and may be either circular or non-circular. Even when the shape is non-circular, the degree of deformation is not particularly limited. Relating to the arrangement of the core layer in the cross-section of the filament, if the core layer is encompassed with the sheath layer substantially concentrically, the excellent silk-like surface luster and light transparency of the fiber according to the present invention can be maintained.

The number of the concave or flat surfaces extending uniformly on the filament surface is two to six and if the number exceeds six, the silk-like surface luster decreases and such a number is not preferable, while, if the said number is two, the surface luster is somewhat inferior to that of silk, so that the said number is preferably three to six.

As mentioned above, when the degree of deformation of the filament is 1.25 to 3.0 and the number of the concave or flat surfaces extending on the filament surface uniformly along the longitudinal axis is two to six, the resulting synthetic fiber is similar to silk in the surface luster and light transparency and particularly, when the above degree of deformation is 1.75 to 3.0 and the number of the concave or flat surfaces is three to six, the silk-like surface luster and light transparency are considerably excellent.

The conjugate form of the sheath-core in the composite fibers according to the present invention may be either concentric or eccentric. The concentric form has superior silklike surface luster and light transparency to the eccentric form. On the other hand, in case of the eccentric form, particularly, the composite fibers composed of polymers having different shrinkabilities have crimpability in addition to the above described optical properties.

As the synthetic linear polymers to be used in the present invention, mention may be made of polyamides, polyesters, polyetheresters, polyacrylonitriles, polyurethanes, polyvinyl chlorides, polyvinylidene chlorides, polyvinyl alcohols, polyureas and the copolymers and blends thereof.

The above described various polymers may be added with inorganic or organic substances, such as, fluorescent whitening agents, pigments, dyestuffs, dyeing assistants, light resisting agents, heat resisting agents, plasticizers and the like.

Particularly, when a fluorescent whitening agent is contained in the core layer or the sheath layer, silk-like unique and excellent surface luster can be imparted to the fiber and more particularly, when the fluorescent whitening agent is contained in the core layer, the durability of the fluorescent whitening agent is considerably improved.

When the dyeing affinities of both the components of the sheath and core layers are different, it is possible to dye the core layer and the sheath layer into different colors and when the sheath component is more excellent in the dye affinity than the core component, even if the core component is dyed with difficulty, a clear dyeing can be effected apparently due to easy dyeability of the sheath component and since it is not necessary to dye the core component clearly, the dyestuff can be saved and various advantages are resulted from.

According to the present invention, the combination of the sheath and core component polymers may be same or different.

The fiber according to the present invention has both the silk-like excellent surface luster and the moderate light transparency and can be produced commercially easily and are suitable for material for producing various clothings, interior ornaments, industrial goods, etc.

The invention will be further explained in detail by the following examples. In the examples, percent means by weight, unless otherwise mentioned. Furthermore, the intrinsic viscosity shows one measured in metacresol at 25° C., unless particularly mentioned.

The surface luster and the light transparency of the fibers were determined as follows: The resulting fibers were woven into a Taffeta of a warp density of 50 f./cm. and a weft density of 25 f./cm., which was mounted on a skin in a usual light room, into which the direct rays of the sun did not shine, and comparatively determined with naked eyes and the results of 10 men's determination were averaged.

Namely, the Taffeta obtained by weaving the fibers of 70 d./18 f., each filament of the fibers having six concave surfaces uniformly extending along the longitudinal axis of the filament and a degree of deformation of 1.54 and obtained by conjugate spinning nylon-6 having an intrinsic viscosity of 1.30, which contains 0.1% by weight of titanium oxide particles, the maximum size of which is $5\mu$ and which comprises 58% having a size of less than $1.0\mu$ as the core component and nylon-6 having an intrinsic viscosity of 1.03, which contains no titanium oxide as the sheath component in a conjugate ratio of 50:50, was considerably high in both the surface luster and the light transparency, which was expressed by ++++++. On the other hand, the Taffeta obtained by weaving the fibers of 70 d./18 f., each filament of the fibers having a circular cross-section and obtained by spinning nylon-6 having an intrinsic viscosity of 1.30, which contains 0.45% by weight of the same titanium oxide particles as described above, was considerably poor in the surface luster and the light transparency, which was expressed by ±. On the basis of such an expression, the Taffeta formed by weaving the fibers obtained in each example was classified as follows with respect to the silk-like surface luster and light transparency corresponding to the degrees.

±—considerably poor
++—somewhat poor
+++—good
++++—good
+++++—high
++++++ or more—considerably high That is to say, among the results obtained in the present invention, a good result is shown by the mark +++ or ++++.

For a better understanding of the invention, reference is taken to the accompanying drawings, wherein.

EXAMPLE 1

Figure 1:
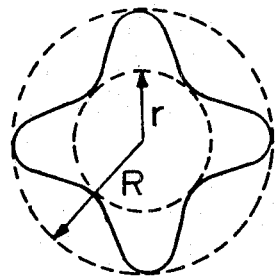
FIG. 1 is a diagram for explaining the degree of deformation of the fiber.
Figure 2:
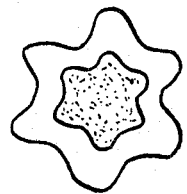
FIG. 2 is an embodiment of cross-section of the fibers according to the present invention.

In spinning sheath-core type composite fibers, nylon-6 having an intrinsic viscosity of 1.30, which contains 0.1 ~ 0.8% of titanium oxide particles, the maximum size of which is 5μ and which comprises 58% having a size of less than 1.0μ, was used as a core component, and another nylon-6 having an intrinsic viscosity of 1.03, which contains 0~0.12% of the above-mentioned titanium oxide particles was used as a sheath component. The two nylon-6 polymers were conjugate spun in a conjugate ratio of 50:50 to obtain composite fibers of 70 d./ 18 f., each filament of the fibers having a cross-section as shown in FIG. 2 and a degree of deformation of 1.54.

The strength, elongation, surface luster and light transparency of the resulting fibers were determined and the obtained results are shown in Table 1.

TABLE 1

| Content of titanium oxide, percent by weight | | Strength, g./d. | Elongation, percent | Surface luster | Light transparency |
|---|---|---|---|---|---|
| Core | Sheath | | | | |
| 0.1 | 0 | 5.21 | 31.4 | ++++++ | ++++++ |
| 0.1 | 0.03 | 5.17 | 32.0 | ++++++ | ++++++ |
| 0.1 | 0.06 | 5.06 | 32.2 | +++++ | +++++ |
| 0.1 | 0.09 | 5.00 | 32.8 | +++++ | +++++ |
| 0.1 | 0.12 | 5.00 | 32.5 | +++++ | +++++ |
| 0.3 | 0 | 5.02 | 28.5 | +++++ | +++ |
| 0.3 | 0.03 | 4.98 | 30.8 | ++++ | +++ |
| 0.3 | 0.06 | 4.85 | 31.2 | +++ | +++ |
| 0.3 | 0.09 | 4.87 | 32.0 | ++ | ++ |
| 0.3 | 0.12 | 4.81 | 31.6 | ++ | ++ |
| 0.8 | 0 | 4.80 | 35.0 | +++ | +++ |
| 0.8 | 0.03 | 4.80 | 35.5 | +++ | +++ |
| 0.8 | 0.06 | 4.78 | 36.1 | +++ | +++ |
| 0.8 | 0.09 | 4.70 | 36.0 | ++ | ++ |
| 0.8 | 0.12 | 4.68 | 37.0 | ++ | ++ |

As seen from Table 1, in the case of the content of titanium oxide in the core component being more than 0.3%, if the content in the sheath component is less than 0.06%, the resulting fiber has a silk-like surface luster and a good light transparency, and particularly, if the content in the sheath component is less than 0.03%, an excellent result is obtained.

On the hand, when the content of titanium oxide in the core component is less than 0.3%, or when the content in the sheath component is more than 0.06%, the surface luster and the light transparency of the resulting fiber are poor and the object of the present invention cannot be attained.

EXAMPLE 2

A sheath component of nylon-6 having an intrinsic viscosity of 1.05, which contains 0.03% of the same titanium oxide as used in Example 1 and a core component of another nylon-6 having an intrinsic viscosity of 1.32, which contains 0.5% of the same titanium oxide as described above, were conjugate spun in the same manner as described in Example 1, except that the conjugate ratio was varied as shown in the following Table 2, to obtain composite fibers of 70 d./18 f.

The strength, elongation, surface luster and light transparency of the resulting fibers were determined and the obtained results are shown in Table 2.

TABLE 2

| Conjugate ratio, (percent) | | Strength, g./d. | Elongation percent | Surface luster | Light transparency |
|---|---|---|---|---|---|
| Core | Sheath | | | | |
| 80 | 20 | 5.26 | 26.5 | ± | ++ |
| 70 | 30 | 5.17 | 28.0 | +++ | +++ |
| 60 | 40 | 5.09 | 30.8 | +++ | +++ |
| 50 | 50 | 5.01 | 31.3 | +++ | +++ |
| 40 | 60 | 4.95 | 33.0 | +++ | ++++ |
| 30 | 70 | 4.81 | 36.0 | ++++ | +++++ |

As seen from Table 2, when the conjugate ratio of the core component to the sheath component is within the range of 70:30~40:60, the resulting fiber has a silk-like good surface luster and a moderate light transparency. However, when the ratio of the core component is more than 70%, the resulting fiber has a considerably poor surface luster and poor light transparency. Furthermore, when the ratio of the sheath component is more than 60%, the resulting fiber has an excessively high light transparency. Therefore, such ranges are not suitable.

EXAMPLE 3

In this example, the following three kinds of titanium oxide particles, having different maximum sizes and particle size distributions were used.

Titanium oxide particles A:
  The maximum size is 5.0μ and 52% of the particles has a size of less than 1.0μ.
Titanium oxide particles B:
  The maximum size is 15μ and 35% of the particles has a size of less than 1.0μ.
Titanium oxide particles C:
  The maximum size is 51μ and 15% of the particles has a size of less than 1.0μ.

A sheath component of nylon-6 having an intrinsic viscosity of 1.02, which contains 0.03% of each above-mentioned titanium oxide and a core component of another nylon-6 having an intrinsic viscosity of 1.31, which contains 0.6% of the same titanium oxide, were conjugate spun in a conjugate ratio of 50:50 to obtain three composite fibers of 70 d./18 f., each filament of the fibers having the same cross-section and degree of deformation as described in Example 1.

The surface luster and light transparency of the resulting fibers are shown in Table 3.

TABLE 3

| | Surface luster | Light transparency |
|---|---|---|
| Titanium oxide particle: | | |
| A | +++ | +++ |
| B | ++ | +++ |
| C | ++ [1] | ++++ [2] |

[1] Surface feels roughly.
[2] Ununiform.

As seen from Table 3, the fibers containing titanium oxide particles B and C respectively are inferior to that containing titanium oxide particles A in the surface luster and light transparency, and particularly, the fiber containing titanium oxide particles C has a rough surface, a poor surface luster and an ununiform light transparency.

EXAMPLE 4

In this example, the same titanium oxide as used in Example 1 was used.

Nylon-6 having an intrinsic viscosity of 1.25, which contains the titanium oxide in an amount as shown in the following Table 4, was used as a sheath forming polymer. Polyethylene terephthalate having an intrinsic viscosity of 0.67 in o-chlorophenol at 30° C., which contains the titanium oxide in an amount as shown in Table 4, was used as a core forming polymer.

Two polymers were conjugate spun in a conjugate ratio of 70:30 to obtain composite fibers of 70 d./18 f., each filament of the fibers having the same cross-section as shown in FIG. 2.

The properties of the resulting fibers are shown in Table 4.

which contains 0.5% of the above-mentioned titanium oxide, were conjugate spun in a conjugate ratio of 50:50 in a sheath-core type to obtain composite fibers of 70 d./18 f., each filament of the fibers having the cross-section as shown in FIG. 2 and a degree of deformation in the range of 1.25~3.0.

TABLE 4

| Content of titanium oxide, percent by weight | | Strength, g./d. | Elongation, percent | Surface luster | Light transparency |
|---|---|---|---|---|---|
| Core | Sheath | | | | |
| 0 | 0 | 5.30 | 30.1 | ++++++++ | ++++++++ |
| 0.3 | 0 | 5.02 | 31.0 | ++++ | +++ |
| 0.3 | 0.03 | 5.08 | 30.5 | +++ | +++ |
| 0.3 | 0.06 | 4.85 | 30.8 | +++ | +++ |
| 0.3 | 0.08 | 4.90 | 31.3 | ++ | ++ |
| 0.6 | 0 | 4.92 | 33.3 | ++++ | +++ |
| 0.6 | 0.03 | 4.98 | 31.5 | +++ | +++ |
| 0.6 | 0.06 | 4.80 | 34.0 | +++ | +++ |
| 0.6 | 0.08 | 4.65 | 33.5 | ++ | ++ |

EXAMPLE 5

A core component of nylon-6 having an intrinsic viscosity of 1.29, which contains 0.3% of the same titanium oxide as used in Example 1 and a sheath component of another nylon-6 having an intrinsic viscosity of 1.03, which contains no titanium oxide, were conjugate spun in a sheath-core type, both the core and sheath components being incorporated with 0.2% of a fluorescent whitening agent, Leucophor BCF (made by Santo Co., Switzerland), and composite fibers of 70 d./18 f. were obtained, each filament of the fibers having the same cross-section and degree of deformation as shown in Example 1.

The strength, elongation, surface luster and light transparency of the resulting fibers were determined. Furthermore, the variation of strength and elongation of the fibers after irradiated with Fade-ometer for 100 hours were determined.

These results are shown in Table 5.

TABLE 5

| Component added with a fluorescent whitening agent | Strength, g./d. | Elongation, (percent) | After irradiated with Fade-ometer for 100 hours | |
|---|---|---|---|---|
| | | | Percentage of strength retention, (percent) | Percentage of elongation retention, (percent) |
| Core | 3.45 | 20.6 | 79.5 | 56.6 |
| Sheath | 3.31 | 18.0 | 52.5 | 45.4 |

Both the two fibers had a good silk-like light transparency, and particularly, a unique surface luster, which had never been obtained in the conventional composite fiber, due to the fluorescent whitening agent.

EXAMPLE 6

A sheath component of nylon-6 having an intrinsic viscosity of 1.01, which contains 0.03% of the same titanium oxide as used in Example 1, and a core component of another nylon-6 having an intrinsic viscosity of 1.33, The properties of the resulting fibers are shown in Table 6.

TABLE 6

| Degree of deformation | Strength, g./d. | Elongation, (percent) | Surface luster | Light transparency |
|---|---|---|---|---|
| 1.15 | 5.21 | 29.5 | ± | +++ |
| 1.25 | 5.08 | 30.2 | +++ | +++ |
| 1.45 | 5.01 | 31.5 | ++++ | +++ |
| 3.0 | 4.56 | 35.0 | ++++ | +++ |
| 3.5 | 4.47 | 36.9 | +++++ | +++ |

As seen from Table 6, when the degree of deformation is within the range of 1.25~3.0, the surface luster and the light transparency are good and when said degree is within the range of 1.45~3.0 these properties are excellent. Particularly, the surface luster depends remarkably upon the degree of deformation.

EXAMPLE 7

By using nylon-6 having an intrinsic viscosity of 1.28 and a nylon-6 copolymer having an intrinsic viscosity of 1.33, which had been obtained by copolymerizing 90 parts of ε-caprolactam, 10 parts of hexamethylenediammonium isophthalate and 1/300 mol of acetic acid, both the nylon-6 and the nylon-6 copolymer containing the same titanium oxide as used in Example 1 in the amount as shown in the following Table 7, they were conjugate spun in a conjugate ratio of 50:50 in a sheath-core type and drawn to obtain two composite fibers D and E of 70 d./18 f. respectively, each filament of the fibers having a degree of deformation of 2.53 and six continuous concave surfaces uniformly extending along the longitudinal axis of the filament.

The strength, elongation, surface luster and light transparancy of the resulting fibers are shown in Table 7.

TABLE 7

| Sample | Core polymer | Sheath polymer | Content of titanium oxide, (percent) | | Strength, g./d. | Elongation, (percent) | Surface luster | Light transparency |
|---|---|---|---|---|---|---|---|---|
| | | | Core | Sheath | | | | |
| Composite fiber D | Nylon-6 | Nylon-6 copolymer | 0.5 | 0.06 | 4.46 | 38.2 | +++ | +++ |
| Composite fiber E | Nylon-6 copolymer | Nylon-6 | 0.6 | 0.03 | 5.08 | 35.0 | +++ | ++++ |

As seen from Table 7, both the two fibers obtained by the method of the present invention have an excellent silk-like surface luster and light transparency.

EXAMPLE 8

A core component of nylon-66 having an intrinsic viscosity of 1.02, which contains 0.6% of titanium oxide particles, the maximum size of which is 5.0μ and in which 61% has a size of less than 1.0μ, and a sheath component of nylon-6 copolymer used in Example 7 having an intrinsic viscosity of 1.33, which contains 0.03% of the above-mentioned titanium oxide, were conjugate spun and drawn in the same manner as described in Example 7 to obtain a composite fiber having a strength of 5.29 g./d., an elongation of 39.9%, and a surface luster and a light transparency shown by ++++ and +++ respectively.

EXAMPLE 9

A core component of nylon-6 having an intrinsic viscosity of 1.25, which contains 0.3% of the same titanium oxide as used in Example 1, and a sheath component of polyethylene terephthalate having an intrinsic viscosity of 0.62 in o-chlorophenol at 30° C., which contains 0.06% of the above-mentioned titanium oxide, were conjugate spun in a conjugate ratio of 50:50 in a sheath-core type and the resulting filaments were drawn to obtain a composite fiber of 70 d./36 f., each filament of the fibers having the same cross-section and degree of deformation as described in Example 1.

The resulting fiber had a strength of 5.50 g./d. and an elongation of 25%. Furthermore, the surface luster was +++ and light transparency was +++ and the fiber has desired silk-like surface luster and light transparency.

EXAMPLE 10

Polyethylene terephthalate having the same intrinsic viscosity as described in Example 4, which contains 0.3% of the same titanium oxide as used in Example 8, was used as a core component. Nylon-6 copolymer having the same intrinsic viscosity as described in Example 7, which contains 0.06% of the same titanium oxide as described above, was used as a sheath component. The two polymers were conjugate spun in a conjugate ratio of core: sheath=0:60 to obtain composite fibers of 70d./18f., each filament of the fibers having four continuous concave surfaces uniformly extending along the longitudinal axis of the filament.

The surface luster and the light transparency of the resulting fiber were ++++ and +++ respectively and the fiber was silk-like.

EXAMPLE 11

Polyethylene terephthalate having an intrinsic viscosity of 0.62 in o-chlorophenol at 30° C., which contains 0.6% of the same titanium oxide as used in Example 8, was used as a core component. Another polyethylene terephthalate having the same intrinsic viscosity as described above, which contains 0.02% of the same titanium oxide as described above was used as a sheath component. The two polymers were conjugate spun in a conjugate ratio of core:sheath=40:60 and hot drawn to obtain composite fibers of 70 d./36 f., each filament of the fibers having the same cross-section as described in Example 1.

The resulting fiber had a strength of 4.36 g./d, an elongation of 17.6% and a surface luster and a light transparency shown by ++++ and +++ respectively, so that it was an excellent silk-like fiber.

EXAMPLE 12

Polyethylene terephthalate (hereinafter abridged as PET) having an intrinsic viscosity of 0.62 in o-chlorophenol at 30° C., and polyethylene oxybenzoate (hereinafter abridged as PEOB) having an intrinsic viscosity of 0.58 in o-chlorophenol at 30° C., both of which contain the same titanium oxide as used in Example 8 in the amount as shown in the following Table 8, were conjugate spun in a conjugate ratio of core:sheath=40:60 in a sheath-core type and drawn to obtain composite fibers F and G of 70 d./36 f. respectively, each filament of the fibers having a degree of deformation of 2.51 and six continuous concave surfaces uniformly extending along the longitudinal axis of the filament.

The surface luster and light transparency of the resulting fibers are shown in Table 8.

TABLE 8

| Sample | Core polymer | Sheath polymer | Content of titanium oxide, percent | | Strength, g./d. | Elongation, (percent) | Surface luster | Light transparency |
|---|---|---|---|---|---|---|---|---|
| | | | Core | Sheath | | | | |
| Composite fiber F | PET | PEOB | 0.5 | 0.02 | 3.30 | 19.8 | ++++ | +++ |
| Composite fiber G | PEOB | PET | 0.5 | 0.02 | 3.45 | 29.0 | +++ | +++ |

Both the two resulting fibers had an excellent silk-like surface luster and light transparency.

EXAMPLE 13

Polyethylene terephthalate having an intrinsic viscosity of 0.68 in o-chlorophenol at 30° C., which contains 0.3% of the same titanium oxide as used in Example 1, was used as a core component. A mixture of polyethylene terephthalate having the same intrinsic viscosity as described above and polyethylene oxybenzoate having an intrinsic viscosity of 0.63 in o-chlorophenol at 30° C. in a mixture ratio of 7/3, which contains 0.03% of the same titanium oxide as described above, was used as a sheath component. The two polymers were conjugate spun in a conjugate ratio of 50:50 and the resulting filaments were drawn to obtain composite fibers of 70 d./36 f., each filament of the fiber having a degree of deformation of 1.45 and six concave surfaces on the filament.

The resulting fiber had a strength of 4.50 g./d., an elongation of 18.5%, and a surface luster and a light transparency shown by ++++ and +++ respectively.

What is claimed is:

1. A sheath-core type composite fiber having a silk-like surface luster and light transparency consisting of synthetic high polymers, which is characterized in that the core component contains at least 0.3% by weight of titanium oxide particles, the maximum size of which is at most 5 microns and which comprise at least 50% by weight of particles having a size of less than 1.0 micron, that the sheath component contains at most 0.06% by weight of said titanium oxide particles, that the ratio of the core component to the sheath component occupying the cross-section of the filament is in the range between 70:30 and 40:60, that two to six concave or flat surfaces uniformly extend along the longitudinal axis of the filament, and that the degree of deformation ranges from 1.25 to 3.0 and is defined as the ratio of the maximum radius to the minimum radius of the cross-section of the fiber in a direction perpendicular to the axis of the fiber.

2. The fiber as claimed in claim 1, wherein the core component contains at least 0.5% by weight of said titanium oxide.

3. The fiber as claimed in claim 1, wherein said ratio of the core component to the sheath component is in the range between 60:40 and 40:60.

4. The fiber as claimed in claim 1, wherein said degree of deformation ranges 1.70 to 3.0.

5. The fiber as claimed in claim 1, wherein the number of the concave or flat surfaces is three to six.

6. The fiber as claimed in claim 1, wherein said titanium oxide particles contain at least 60% by weight of particles having a size of less than 1.0μ.

7. The fiber as claimed in claim 1, wherein the sheath component contains less than 0.03% by weight of said titanium oxide.

8. The fiber as claimed in claim 1, wherein the cross-section of the core is circular.

9. The fiber as claimed in claim 1, wherein the cross-section of the core is non-circular.

10. The fiber as claimed in claim 1, wherein the core is arranged concentrically with the sheath in the cross-section.

11. The fiber as claimed in claim 1, wherein the core is arranged eccentrically with the sheath in the cross-section.

12. The fiber as claimed in claim 1, wherein said synthetic high polymers are selected from the group consisting of polyamides, polyesters, polyetheresters, polyacrylonitrile, polyurethane, polyvinyl chloride, polyvinylidene chloride, polyvinyl alcohol, polyurea, copolymers and mixtures thereof.

13. The fiber as claimed in claim 1, wherein two components of sheath and core both consist of nylon-6.

14. The fiber as claimed in claim 1, wherein the sheath component is nylon-6 and the core component is polyethylene terephthalate.

References Cited

UNITED STATES PATENTS

| 2,000,671 | 5/1935 | Singmaster | 161—174 |
| 2,987,797 | 6/1961 | Breen | 161—175 |
| 3,329,557 | 7/1967 | Magat et al. | 161—172 |

FOREIGN PATENTS

| 841,327 | 7/1960 | Great Britain | 161—X-Sec. Digest |
| 1,450,008 | 7/1966 | France | 161—X-Sec. Digest |

ROBERT F. BURNETT, Primary Examiner

L. M. CARLIN, Assistant Examiner

U.S. Cl. X.R.

161—175, 177